United States Patent [19]
Cruse et al.

[11] Patent Number: 5,581,478
[45] Date of Patent: Dec. 3, 1996

[54] FACILITY ENVIRONMENTAL CONTROL SYSTEM

[76] Inventors: Michael Cruse, 2000 Meadow Ridge Rd.; Douglas G. Hibberd, 8560 Valley Oak Dr., both of Prescott, Ariz. 86301

[21] Appl. No.: 421,629

[22] Filed: Apr. 13, 1995

[51] Int. Cl.$^6$ ..................................................... G06F 13/42
[52] U.S. Cl. ................... 364/505; 364/571.03; 364/138; 364/240.8; 364/242.94; 395/181
[58] Field of Search ............................ 364/240.8, 514 C, 364/579, 242.94, 505, 138, 571.03–57.08; 395/200.11, 181, 600

[56] References Cited

U.S. PATENT DOCUMENTS

| | | | |
|---|---|---|---|
| 5,086,385 | 2/1992 | Launey et al. | 364/188 |
| 5,185,860 | 2/1993 | Wu | 395/200 |
| 5,289,468 | 2/1994 | Yoshida | 370/85.13 |
| 5,295,244 | 3/1994 | Dev et al. | 395/161 |
| 5,319,363 | 6/1994 | Welch et al. | 340/825.36 |
| 5,331,642 | 7/1994 | Valley et al. | 371/5.2 |
| 5,367,635 | 11/1994 | Bauer et al. | 395/200 |
| 5,386,371 | 1/1995 | Mather et al. | 364/571.08 |
| 5,428,555 | 6/1995 | Starkey et al. | 364/551.01 |
| 5,432,711 | 7/1995 | Jackson et al. | 364/514 |
| 5,452,433 | 9/1995 | Nihart et al. | 395/500 |
| 5,495,607 | 2/1996 | Pisello et al. | 395/600 |

OTHER PUBLICATIONS

Henry, Chang; "Managing mixed networs"; PC User, n271, p. 101(2) Nov. 15, 1995.
Silter, Tom; "Power management systems"; STACKS, v2, n10, p. 41(7) Oct. 1994.
Bigney, Steve; "Take command of your reome devices (E–Comms Inc's E–commander Lan monitor)", PC magazine, v13, n19, pNE22(1) Nov. 8, 1994.
B. Stewart, "Definitions of Managed Objects for RS–232–like Hardware Devices using SMIv2", Network Working Group, RFC 1659 (Jul. 1994).
B. Stewart, "Definitions of Managed Objects for Parallel-–printer–like Hardware Devices using SMIv2", Network Working Group, RFC 1660 (Jul. 1994).
L. G. Paul, "SNMP–vs.–DMI battle called a false dichotomy", PC Week (Feb. 7, 1994).
"SNMP versus CMIP", IBM System User (May 1994).
J. H. Lee, "SNMP: the wonder years", LAN Computing (Apr. 1994).
"Toaster–MIB"; RFC 1155–SMI, RFC 1212, RFC 1213 No Date.
"CD Player MIB", Epilogue Technology Corporation, TGV, Inc., RFC 1066–MIB (Jun. 20, 1990).
S. Harnedy, "Total SNMP: Exploring the Simple Network Management Protocol", pp. 7–10, 12, 13, 26 and 27 (Cardinal Business Media 1994).
W. Stallings, "SNMP, SNMPv2, and CMIP: The Practical Guide to Network–Management Standards" pp. xiii–xv (Addison–Wesley 1993).
G. Wilkie, "Strategies for integrating SNMP and CMIP", Telecommunications (Feb. 1994).

*Primary Examiner*—Ellis B. Ramirez
*Assistant Examiner*—Kamini S. Shah
*Attorney, Agent, or Firm*—Ice Miller Donadio & Ryan

[57] ABSTRACT

A facility environmental control ("FEC") system is disclosed that communicates using an open network management protocol such as the simple network management protocol ("SNMP"). The FEC system includes a first plurality of FEC devices operable to obtain data concerning the environment of a facility and a second plurality of FEC devices operable to receive command signals and perform operations that affect the environment of the facility in accordance with the received command signals. The system further includes a control system operably connected to the first and second plurality of FEC devices, and a control system agent operably connected to the control system. In general, the control system receives data from the first plurality of FEC devices and provides command signals to the second plurality of FEC devices. The control system agent is preferably operable to receive and send SNMP messages to a management node, wherein said SNMP messages include information concerning the operation of the control system.

7 Claims, 4 Drawing Sheets

FacilityTemp ::=
INTEGER {
        FahrDeg58(0),
        FahrDeg59(1),
        FahrDeg60(2),
        FahrDeg61(3),
        FahrDeg62(4),
        FahrDeg63(5),
        FahrDeg64(6),
        FahrDeg65(7),
        FahrDeg66(8),
        FahrDeg67(9),
        FahrDeg68(10),
        FahrDeg69(11),
        FahrDeg70(12),
        FahrDeg71(13),
        FahrDeg72(14),
        FahrDeg73(15),
        FahrDeg74(16),
        FahrDeg75(17),
        FahrDeg76(18),
        FahrDeg77(19),
        FahrDeg78(20)
}

← 70

TimeTable ::=
INTEGER {
        midnite(0),
        am1215(1),
        am1230(2),
        am1245(3),
        am0100(4),
        am0115(5),

.
        .
        .

pm1115(93),
        pm1130(94),
        pm1145(95)
}

← 71

*Fig. 3* zoneOneTemp OBJECT-TYPE
    SYNTAX FacilityTemp
    MAX-ACCESS read-only
    STATUS current
    DESCRIPTION
        "The current temperature in zone 1 of the facility."
    ::= { temp 1 } zoneTwoTemp OBJECT-TYPE
    SYNTAX FacilityTemp
    MAX-ACCESS read-only
    STATUS current
    DESCRIPTION
        "The current temperature in zone 2 of the facility."
    ::= { temp 2 } heatOneStatus OBJECT-TYPE
    SYNTAX INTEGER { off(0), low(1), mid(2), high(3) }
    MAX-ACCESS read-write
    STATUS current
    DESCRIPTION
        "The current setting of the output power of heater one."
    ::= { heatStatus 1 } ambNightZoneOneTemp OBJECT-TYPE
    SYNTAX FacilityTemp
    MAX-ACCESS read-write
    STATUS current
    DESCRIPTION
        "The current setting of the desired night-time ambient temperature
        for zone 1, which may be used as a parameter limit by the control
        system."
    ::= { ambNightTemp 1 } beginNight OBJECT-TYPE
    SYNTAX TimeTable
    MAX-ACCESS read-write
    STATUS current
    DESCRIPTION
        "The current setting of the time when the control system enters
        into night mode."
    ::= { time 1 }

*Fig. 4*

FACILITY ENVIRONMENTAL CONTROL SYSTEM

FIELD OF THE INVENTION

This invention relates to computer networks, and, in particular, to such networks used in facility environmental control systems.

BACKGROUND OF THE INVENTION

Facility environmental control systems often employ computer networks to perform management and control functions. Facility environmental control ("FEC") systems typically include an integrated collection of devices that monitor and affect the environment of a facility or building, including heating, venting, and cooling ("HVAC") equipment. Devices that monitor the environment, such as temperature sensors and the like, are referred to herein as measuring devices. Devices that affect the environment, such as heating and cooling equipment and the like, are referred to as controlled devices. One example of an FEC system is a common residential thermostat/furnace system. Such a system includes a thermostat for measuring the temperature and a circuit that controls the operation of the furnace, based on the measured temperature. FEC systems for large facilities include a substantial number of controlled devices and measuring devices.

In such large scale systems, control systems, which typically comprise one or more programmed computers, process and utilize the information received from the measuring devices to control the controlled devices. The control systems of advanced FEC systems not only regulate environmental conditions such as ambient temperature and humidity, but also the energy consumption of a facility. Consequently, FEC systems may monitor and control lighting, refrigeration, and other energy consuming equipment.

A requirement of a computer-based control system of a large scale FEC system is that it must be accessible by building management personnel in order to allow adjustment of environmental parameters. Environmental parameters include the desired ambient conditions of a facility such as, for example, the desired nighttime and daytime ambient temperature. To this end, the control system is typically provided with user interface software that allows the building management personnel to query measured conditions, query controlled device status, and alter system parameters.

Currently, computer-based FEC control systems employ software having proprietary program code, variable types, and data structures. As a result, all system software including the user interface software must ordinarily be provided by a single vendor. In such systems, referred to as closed systems, the customer is faced with a decision to either accept the vendor's standard user interface or negotiate a custom-designed interface to be developed by the vendor. Both approaches have disadvantages. In particular, while a standard vendor user interface may operate adequately, it may not have the same look and feel as the user interface of other computer systems in the customer's facility. As a result, the customer must train its employees to become familiar with new user interface configuration. With the proliferation of computer systems in the work place, each new user interface configuration adds undesirable complexity and training costs. In the alternative, requiring the FEC system vendor to provide a custom designed interface can introduce delays and often result in higher costs for at least the two following reasons. First, it is likely that the vendor does not possess expertise in user interface development techniques and therefore cannot efficiently develop new custom interface software. Second, to develop such software, the vendor must become familiar with the customer's user interface configurations.

One solution to the disadvantages discussed above is to allow the customer to design the user interface to suit his or her own requirements. A drawback to this approach is that the customer must become familiar with a significant amount of detail about the vendor system software including the proprietary program code, variable definitions, and data structures. Not only is the learning of such details time consuming and difficult, but furthermore vendors may prefer not to permit such access to their proprietary information.

A further disadvantage of single vendor closed systems is the lack of interoperability with the systems of other vendors. One consequence of having little or no interoperability is that if functionality is to be added to the FEC system at a later date, it must be provided by the same vendor. The result is highly constrained system flexibility and expandability.

OBJECTS OF THE INVENTION

An object of the invention is to provide an FEC system having an open architecture that allows customers and other vendors to access information from the system and its control devices, while nevertheless allowing FEC system vendors to maintain proprietary software and structures.

An other object of the invention is to allow a proprietary FEC control system to communicate with a user interface or management device using non-proprietary data structures and variable definitions.

Another object of the invention is to provide an FEC system that utilizes standardized definitions for managed FEC system objects.

Another object of the invention is to provide an FEC system that utilizes SNMP to communicate between the user interface system and the control system.

BRIEF DESCRIPTION OF THE DRAWINGS

FIGS. 3 and 4 show exemplary MIB definitions which may suitably be used in an FEC-oriented MIB Group for use in a system such as the system illustrated in FIG. 1.

SUMMARY OF THE INVENTION

The present invention achieves the above and other objects by employing a facility environment control system and method that is operable to communicate using an open network management protocol such as SNMP. By employing the open network management protocol and related standard object definitions, the present invention overcomes the prior limitations of single vendor closed systems and allows for greater flexibility and interoperability between systems from multiple vendors.

The present invention includes in one embodiment a facility environmental control ("FEC") system, which includes a first plurality of FEC devices operable to obtain data concerning the environment of a facility and a second plurality of FEC devices operable to receive command signals and perform operations that affect the environment of the facility in accordance with the received command signals. The system further includes a control system operably connected to the first and second plurality of FEC devices, and a control system agent operably connected to the control system. The control system, in general, receives data from the first plurality of FEC devices and provides command signals to the second plurality of FEC devices, thereby regulating the environment according to predetermined parameters. The control system agent is operable to receive and send simple network management protocol ("SNMP") messages to a management node, wherein said SNMP messages include information concerning the operation of the control system. The management node is operable to alter the predetermined parameters by sending one or more SNMP messages to the control system agent.

The above features and advantages, as well as other features and advantages, will become readily apparent to those of ordinary skill in the art by reference to the following detailed description and the accompanying drawings.

DETAILED DESCRIPTION

Figure 1:
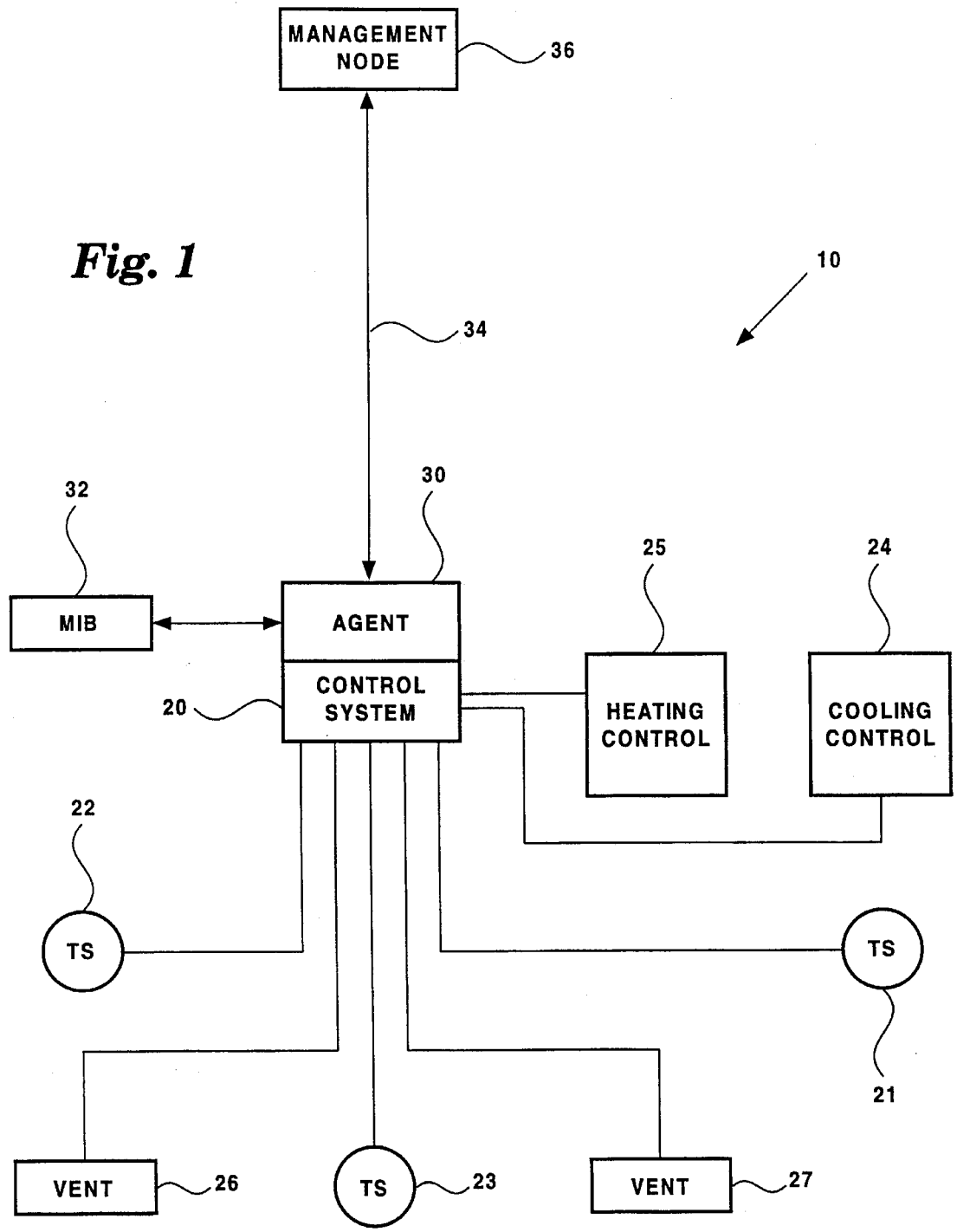
FIG. 1 shows an FEC system according to the present invention that employs SNMP-based network communications.

FIG. 1 shows an FEC system 10 that employs SNMP-based network communications according to the present invention. The FEC system 10 is operably connected through a network 34 to a management node 36. The network 34 may suitably comprise a portion of a local area network, wide area network or the like. The network preferably conforms to the Ethernet and IEEE 802.3 standard as well as the TCP/IP protocol suite. The management node 36 includes a user interface tool which may suitably be a personal computer ("PC") executing user interface software.

In general, the management node 36 uses SNMP messages and standardized object definitions, in other words, data structures and variable definitions, to communicate requests to the FEC system 10 over the network 34. The term SNMP as use herein represents either version 1 or 2 of the simple network management protocol, both of which are well known and include a publicly-known standard, as discussed in W. Stalling, *SNMP, SNMPv2 and CMIP the Practical Guide Network-Management Standards,* Preface xv (Addison-Wesley 1993). SNMP is generally used to manage a plurality of objects, which are standardized data structures representative of a system function. For example, according to the present invention, one managed object may represent the current temperature data corresponding to a select area of the facility. SNMP commands may then be used to, among other things, obtain values from managed objects and send values to managed objects. An SNMP GetRequest command, for example, may be used to retrieve temperature data pertaining to a select area of the facility. An SNMP SetRequest command, alternatively, may be used to change a value in a managed object, such as a current thermostat setting. A set of managed objects pertaining to a particular industry or family of devices are typically associated with a set of standard object definitions known as a MIB Group, which are discussed in more detail further below.

In general, the FEC system 10 operates in accordance with the SNMP commands provided by the management node 36. For internal operations, however, the FEC system 10 utilizes proprietary or vendor-specific program code, variable definitions, and data structures.

The FEC system 10 includes a control system 20 operably connected to first and second pluralities of FEC devices and a control system agent 30. The first plurality of FEC devices include measuring devices that obtain data concerning the environment of a facility, and are exemplified by temperature sensors 21, 22, and 23. The temperature sensors 21, 22, and 23 are located at separate, select areas of the facility. Typically, an FEC system such as FEC system 10 includes, in addition to temperature sensors, humidity sensors, smoke sensors, motion sensors, and light sensors. The second plurality of FEC devices include controlled devices that affect the environment of the facility, and are exemplified by a heater controller 25, an air conditioning controller 24, and vent controllers 26 and 27. Other controlled devices include lighting control systems, humidifier and de-humidifier control systems, sprinkler systems, and alarm systems. In addition to environment-affecting equipment, the controlled devices may include other power consuming equipment such as laundry systems.

The control system 20 comprises one or more interconnected computers having a plurality of input/output ports to facilitate connection with the first and second plurality of FEC devices. If the control system 20 includes two or more computers, the computers may suitably be interconnected through a portion of the network 34. In any event, the control system 20 is designed to regulate the environment of a facility such as an office building by obtaining data from one or more measuring devices, determining from the obtained data whether an adjustment to some environmental factor is required, and then altering the status of one or more controlled devices in order to alter the environment accordingly. To this end, the control system 20 includes a computer program executable by the computer that provides the appropriate data processing and decision making functionality. The control system 20 regulates or alters the environment in accordance with predefined parameters, which may include, for example, optimal or desired daytime temperature, humidity, lighting and energy consumption conditions. The control system 20 typically communicates with and controls the operation of the FEC devices using proprietary program code, variable definitions, and data structures. Suitable control systems that fit the above description are commercially available and are often referred to a data acquisition and control systems ("DACS") or data acquisition and control nodes ("DACNs").

Figure 2:
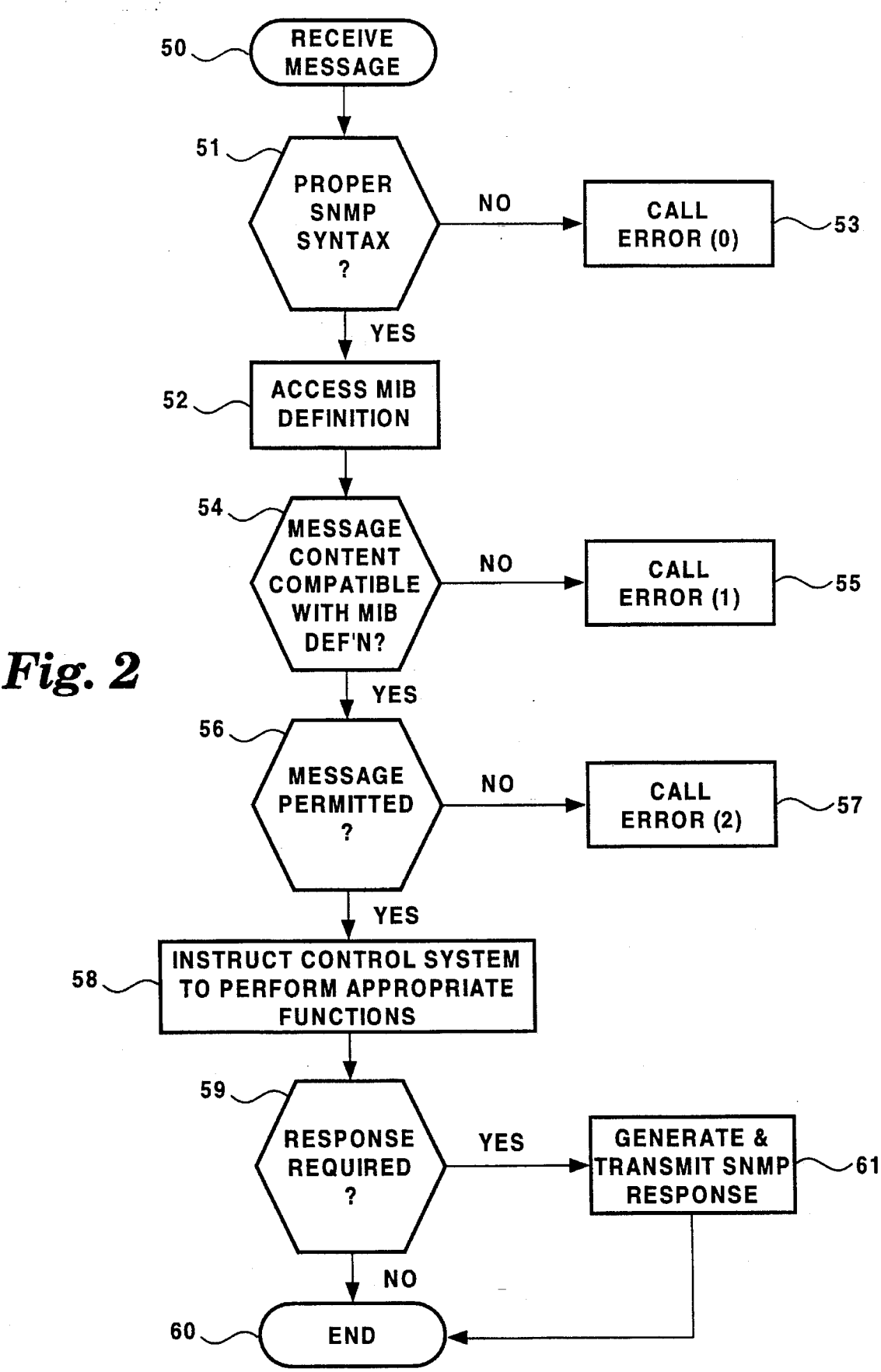
FIG. 2 shows a flow diagram of the control system agent which comprises a portion of the FEC system illustrated in FIG. 1.

The control system agent 30 comprises a device operable to execute computer program instructions, and may share some or all of computer hardware that is incorporated into the control system 20. The control system agent 30 is generally operable to receive and respond to SNMP messages received from the management node 36. FIG. 2 shows a block diagram of the steps executed by the control system agent 30, and is discussed further below.

Referring again to FIG. 1, the control system agent 30 is further connected to a Management Information Base 32, or MIB. The MIB 32 is operable to correlate the control system's proprietary variables and data structures with the standard object definitions used by the SNMP messages. To this end, the MIB 32 functions as both a data conversion device and a collection of access points used by SNMP messages to communicate with the control system 20.

In the present invention, the managed objects relate to the status and control of FEC devices. Each managed object is associated with a standard object definition or MIB definition. An exemplary MIB definition entitled zoneOneTemp may be used to define a structure for data representative of the temperature in a select zone of the facility. The set of standard object definitions for objects accessible through the MIB 32 are collectively referred to as a MIB Group. MIB Groups typically comprise a publicly available, published standard. Several standardized MIB Groups exist for a variety of industries and devices including, for example, an RS-232 MIB Group that contains a set of MIB definitions for use with RS-232 communication devices. Although no particular FEC-oriented MIB Group has yet been designated as a standard, those of ordinary skill in the art will be able to develop the required MIB definitions to suit their needs, or in the alternative, comply with a standard in the event one is promulgated. For illustration purposes, FIGS. 3 and 4 show exemplary MIB definitions that may be included in an FEC-oriented MIB Group for use with the present invention.

As shown in FIG. 3, the FEC-oriented MIB Group may contain variable-type definitions, such as FacilityTemp 70 or TimeTable 71. The variable-type definition Facility Temp 70 defines a structure representative of temperature in Fahrenheit degrees. For example, if the integer "13" is transmitted for an expected FacilityTemp value, then the receiving entity interprets the "13" to represent a temperature of 71 degrees Fahrenheit. MIB definitions of this type are well known and may be employed by those of ordinary skill in the art to define FEC-related managed objects.

In addition, the FEC-oriented MIB Group will typically also contain several OBJECT-TYPE definitions, such as those illustrated in FIG. 4. FIG. 4 illustrates five exemplary MIB definitions for use in an FEC system. The OBJECT-TYPEs define the structure and syntax of the managed objects. For example, the OBJECT-TYPEs include read-only definitions through which the management node 36 can access data from the control system 20, but cannot otherwise affect its operation. The MIB definition zoneOneTemp as illustrated in FIG. 4 is a read-only OBJECT-TYPE. In operation, the management node 36 requests to read the temperature of "zone one" by sending an SNMP message GetRequest zoneOneTemp. The MIB definition format of such OBJECT-TYPEs is well-known to those of ordinary skill in the art. OBJECT-TYPEs also include read-write definitions, such as the one illustrated by ambNightZoneOneTemp of FIG. 4. In read-write definitions, the management node 36 may, in addition to reading a value, change a value using SetRequest command. Thus, for example, using ambNightZoneOneTemp, the setting for the desired ambient night time temperature for zone one may either be read, using an SNMP GetRequest command, or written, using an SNMP SetRequest command.

Returning again to FIG. 1, a typical operation of the FEC system 10 is discussed hereinbelow. During normal day to day operation, the temperature sensors 21, 22, and 23 measure the temperature in different portions of the facility. The temperature sensors 21, 22, and 23 provide a voltage, current, or resistance value that is representative of the localized temperature. The control system 20 periodically polls the temperature sensors 21, 22, and 23 and stores the polled data. The control system 20 also from time to time determines whether the measured temperature data is consistent with a set of predetermined parameters, and in particular, whether the temperature is sufficiently close to the desired ambient temperature. If not, then the control system 20 provides an appropriate command signal to either the heat controller 25, vent controllers 26, 27 or air conditioning controller 24 in order to bring the temperature back within the parameters. Other parameters, such as humidity and lighting may be monitored and controlled in an analogous manner.

Occasionally, a facility manager may desire to either view the various system parameters or measurements or even redefine one or more parameters. For example, the facility manager may desire to reduce the ambient day-time temperature in the facility from 72 degrees Fahrenheit to 70 degrees Fahrenheit. In such cases, the manager may enter the request to the management node 36 via the user interface. The management node 36 then generates the appropriate SNMP message and provides the SNMP message over the network 34 to the control system agent 30. The SNMP message corresponding to setting the desired day-time ambient temperature to 70 degrees Fahrenheit is defined by the standard MIB definitions.

The control system agent 30 then employs the MIB 32 to correlate the incoming standardized data structures and variables to their proprietary counterparts utilized internally by the control system 20. For example, if the SNMP message included a request to change the ambient day temperature to 70 degrees, then the agent 30 assigns an appropriate value to the variable or variables used by the control system software to control the daytime ambient temperature.

According to the present invention, the user interface software in the management node 36 does not require the capability to access or read the proprietary control system variables or data structures in order to read or alter system parameters, or even to simply read measured data. The management node 36 instead provides an SNMP command using standard or generic MIB definitions for the desired managed object. The MIB 32 receives the standard or generic definition through the agent 30, and then communicates with the control system 20. Because of this configuration, the user interface at the management node 36 may be devised by a party with little or no knowledge of the proprietary software, data structures and variable definitions of control system 20 or FEC devices 21, 22, 23, 24, 25, 26 or 27. As a result, the facility manager may design the user interface to suit his or her needs, and even integrate the user interface with other systems in the facility.

FIG. 2 shows an exemplary flow diagram 40 of steps performed by the control system agent 30 upon receipt of a message from the management node 36. The flow diagram 40 contains high level steps or routines, the coding into software of which would be known to those of ordinary skill in the art. The flow diagram 40 is given by way of example only, and those of ordinary skill in the art will be able to devise other suitable programs.

In step 50, the agent receives a message over the network 34. As an initial matter, in step 51, the agent determines whether the message is in proper SNMP syntax. If so, then the agent proceeds to execute step 52. If not, then in step 53, the agent calls an error routine and provides an argument or value "0" which signifies the existence of a syntax error. The error routine may then execute subsequent steps to log the error and/or notify the management node 36 in accordance with SNMP procedures. In the alternative, if the system is devised to communicate using protocols other than SNMP, the agent in step 53 may pass control to another routine that uses another communications protocol.

If the message employs proper SNMP syntax, then, in step 52, the agent accesses the corresponding managed object as specified in the received SNMP message. For example, the SNMP message might comprise GetRequest zoneOneTemp. In such a case, the agent would access the managed object zoneOneTemp in the MIB. Thereafter, in step 54, the agent determines whether the message content is compatible with the corresponding MIB definition. For example, the agent may determine whether any data provided within the message is of the proper type and length. If the answer in step 54 is no, then in step 55, the agent calls the error routine and provides an argument "1", signifying a mismatch error. The error routine may then perform the appropriate operations, such as issuing an SNMP error response.

If, however, the answer in step 54 is yes, then the agent proceeds to execute step 56. In step 56, the agent determines whether the management node 36 is permitted to perform the operation indicated by the SNMP message. For example, some management nodes may not be authorized to access certain data within the system, in other words, the requesting management node may not have "clearance" to access certain managed objects. Different levels of authorization are utilized in systems in which there are several nodes with management capability. If the management node 56 is not authorized for the requested action, then in step 57, the agent calls the error routine and provides an argument value of 2, signifying that access was denied.

If, however, the answer in step 56 is yes, then in step 58, the agent accesses the appropriate variables and data within the control system 20 and translates between the MIB defined values and the control system 20 values to perform the requested action within the SNMP message. For example, if the SNMP message included GetRequest zoneOneTemp, the agent would query the control system 20 for the latest temperature readings for the temperature sensors that are located in the area of the facility determined to be zone one.

Thereafter, in step 59, the agent queries whether a response is required, such as, for example, in an SNMP GetRequest message. If not, the agent has completed the message processing in step 60, and may return to a state in which it awaits the next SNMP message. If so, however, such as in the example discussed above, then in step 61 the agent translates the data from the form provided by the control system 20 to the standard data structure as defined in the MIB Group. The agent then generates an SNMP message including the properly structured data response and provides the message to the management node 36 over the network 34.

It is to be understood that the above-described embodiments of the invention are merely illustrative. Other implementations may readily be devised by those of ordinary skill in the art which will embody the principles of the invention and fall within the spirit and scope thereof. In particular, the use of one management node and one facility environmental control system in the system illustrated in FIG. 1 is provided for clarity of exposition. Those of ordinary skill in the art may readily expand the system to include several management nodes and several FEC systems or subsystems, similar in structure and operation to the FEC system 10. In fact, the use of SNMP communications and standard object definitions facilitates the incorporation of several FEC systems or subsystems from several vendors. Moreover, network management protocols other than SNMP version 1 or version 2 may be utilized. For example, common management information protocol ("CMIP") or Desktop Management Interface ("DMI") may be used. In fact, any open network management protocol that operates in conjunction with standard object definitions will suffice.

What is claimed is:

1. A facility environmental control ("FEC") system comprising:
    a) a first plurality of FEC devices operable to obtain data concerning the environment of a facility;
    b) a second plurality of FEC devices, said second plurality of FEC devices operable to receive command signals and perform operations corresponding to the command signals that affect the environment of the facility;
    c) a control system operably connected to the first and second plurality of FEC devices, the control system operable to receive and store data concerning the environment of a facility from the first plurality of FEC devices, and further operable to provide command signals to the second plurality of FEC devices based on the received data and a set of operating parameters;
    d) a control system agent operably connected to the control system, the control system agent operable to receive and send messages to a management node using an open network protocol and standard object definitions, wherein said messages include information concerning the operation of the control system.

2. The system of claim 1 wherein the control system agent is further operable to receive and send simple network protocol messages ("SNMP") to a management node.

3. The system of claim 1 wherein the control system agent is further operable to send messages that include data representative of data received from at least one of the first plurality of FEC devices.

4. The system of claim 1 wherein the control system agent is further operable to alter one or more operating parameters in accordance with at least one message received from the management node.

5. The system of claim 1 wherein the control system includes at least one computer.

6. The system of claim 1 wherein the control system agent further includes a management information base ("MIB") connected to the control agent, said MIB operable to obtain from the control system information concerning the operation of the control system.

7. A method of managing a facility environmental control ("FEC") system, the FEC system including a plurality of FEC devices and a control system, the method comprising:
    a) employing the control system agent to monitor and control a plurality of FEC devices using a proprietary set of variable definitions and data structures;
    b) generating an open network management protocol message containing a request, the message being generated using a standard set of variable definitions and data structures;
    c) providing the message to a control system agent;
    d) employing the control system agent to provide the request to the control system using the proprietary set of variable definitions and data structures; and
    e) causing the control system to monitor and control the plurality of FEC devices in accordance with the request.

* * * * *